(12) United States Patent
Ito et al.

(10) Patent No.: US 6,220,642 B1
(45) Date of Patent: Apr. 24, 2001

(54) VEHICULAR POWER SEAT SLIDE DEVICE

(75) Inventors: Sadao Ito, Anjo; Hideki Kawabata, Aichi-ken; Genta Moriyama, Anjo, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/450,273

(22) Filed: Nov. 26, 1999

(30) Foreign Application Priority Data

Nov. 26, 1998 (JP) .................................................. 10-336008

(51) Int. Cl.[7] ...................................................... B60N 2/06
(52) U.S. Cl. .................... 296/65.14; 248/429; 297/344.1
(58) Field of Search ............................ 296/65.13, 65.14, 296/65.15, 68.1; 248/429; 74/89.15; 297/344.1

(56) References Cited

U.S. PATENT DOCUMENTS

| 4,645,159 | 2/1987 | Terada et al. . | |
|---|---|---|---|
| 5,048,886 | * 9/1991 | Ito et al. ............................. | 296/65.14 |
| 5,150,872 | * 9/1992 | Isomura ................................ | 248/429 |
| 5,316,258 | 5/1994 | Gauger et al. . | |
| 5,447,352 | * 9/1995 | Ito et al. ............................. | 296/65.14 |

FOREIGN PATENT DOCUMENTS

| 3502345 | 8/1985 | (DE) . |
| 4127503 | 2/1993 | (DE) . |
| 4330367 | 3/1995 | (DE) . |
| 9-142181 | 6/1997 | (JP) . |

* cited by examiner

Primary Examiner—Joseph D. Pape
(74) Attorney, Agent, or Firm—Burns, Doane, Swecker & Mathis, LLP

(57) ABSTRACT

A vehicular power seat slide device includes a lower rail adapted to be fixed to a vehicle body floor, an upper rail slidably mounted on the lower rail for supporting a seat device, a nut member secured to the lower rail, and a screw shaft threadably engaged with the nut member and operatively associated with a gear box. To reduce the bending moment in the screw shaft resulting from a load applied to the upper rail in the vehicle lengthwise direction, a flange is provided on the screw shaft, and a block member is secured to the upper rail between the flange and the gear box, with the block member being mounted with respect to the screw shaft to allow rotation of the screw shaft.

13 Claims, 3 Drawing Sheets

VEHICULAR POWER SEAT SLIDE DEVICE

This application is based on and claims priority under 35 U.S.C. §119 with respect to Japanese Application No. 10(1998)-336008 filed on Nov. 26, 1998, the entire content of which is incorporated herein by reference.

FIELD OF THE INVENTION

The present invention generally relates to a vehicle seat. More particularly, the present invention pertains to vehicular power seat slide device.

BACKGROUND OF THE INVENTION

A known type of vehicular power seat slide device is disclosed in Japanese Patent Laid-Open Publication No. Hei. 9(1997)-142181 published on Mar. 3, 1998 without examination. This known vehicular power seat slide device includes a lower rail fixed to the vehicle body floor, an upper rail supporting a seat device and slidably mounted on the lower rail, a nut member fixed to the lower rail, a screw shaft rotatably supported on the upper rail and threadably engaged with the nut member, and a gear box provided on the upper rail and associated with the screw shaft and an electric driving source.

When the electric driving source is turned on, the resulting rotation of the output shaft is transmitted to the screw shaft by way of the gear box. The screw shaft is thus rotated relative to the nut member, thereby moving the upper rail relative to the lower rail. As a result, the position of the seat device in the vehicle lengthwise direction is adjusted relative to the vehicle body floor.

In addition, the gear box is pivoted by a pin to a bracket which is provided at a front end portion of the upper rail, and a damper is disposed between the gear box and a flange formed at the front end portion of the upper rail. When a load in the direction of the vehicle lengthwise direction is applied to the upper rail, the load is transmitted from the screw shaft to the gear box due to the fact that the upper rail is restricted to the lower rail by the thread engagement between the nut member and the screw shaft. The resultant load is received at the flange after being absorbed partially in the damper. Thus, the rigidity of the vehicle power seat slide device is maintained.

However, the vehicular power seat slide device is susceptible of certain improvements. The gear box is held by the upper rail in a rotatable manner and this causes a rotation of the gear box relative to the upper rail when a load is applied to the gear box in the vehicle lengthwise direction. Thus, upon collision of the vehicle, if the load applied to the upper rail is extremely large, the screw shaft may be deformed. In the worst case, the gear box may be broken.

In light of the foregoing, a need exists for a vehicular power seat slide device that is not as susceptible to the same drawbacks mentioned above.

SUMMARY OF THE INVENTION

Considering the foregoing, one aspect of the present invention involves a vehicular power seat slide device that includes a lower rail adapted to be fixed to a vehicle body floor, an upper rail slidably mounted on the lower rail for supporting a seat device, a nut member secured to the lower rail, a screw shaft threadably engaged with the nut member, and an electrical drive source producing a rotational output upon operation. A flange is provided on the screw shaft and a gear box is held by the upper rail and operatively associated with the electrical drive source and the screw shaft. The gear box transmits the rotational output from the electrical drive source to the screw shaft to establish rotation of the screw shaft relative to the nut member to thereby effect sliding movement of the upper rail relative to the lower rail. A block member is secured to the upper rail and mounted relative to the screw shaft to allow rotation of the screw shaft. The block member is positioned between the flange and the gear box.

According to another aspect of the invention, a vehicular power seat slide device includes a lower rail adapted to be fixed to a vehicle body floor, an upper rail slidably mounted on the lower rail for supporting a seat device, a nut member secured to the lower rail, a screw shaft threadably engaged with the nut member, and a flange provided on the screw shaft. A gear box is secured to the upper rail and is operatively associated with the screw shaft to establish rotation of the screw shaft relative to the nut member to effect sliding movement of the upper rail relative to the lower rail. A mechanism is secured to the upper rail and operatively engageable with the flange to transmit a load force occurring during a collision and applied to the screw shaft to the upper rail.

According to a further aspect of the invention, a vehicular power seat slide device includes a lower rail adapted to be fixed to a vehicle body floor, an upper rail slidably mounted on the lower rail for supporting a seat device, a nut member secured to the lower rail, a screw shaft threadably engaged with the nut member, a gear box mount secured to the upper rail, and a gear box accommodated within the gear box mount and operatively associated with the screw shaft to establish rotation of the screw shaft relative to the nut member to effect sliding movement of the upper rail relative to the lower rail. A block member is secured to the upper rail and is positioned in substantially contacting relationship to the gear box mount to operatively engage the gear box mount and transmit a load force occurring during a collision and applied to the screw shaft to the upper rail by way of the block member.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
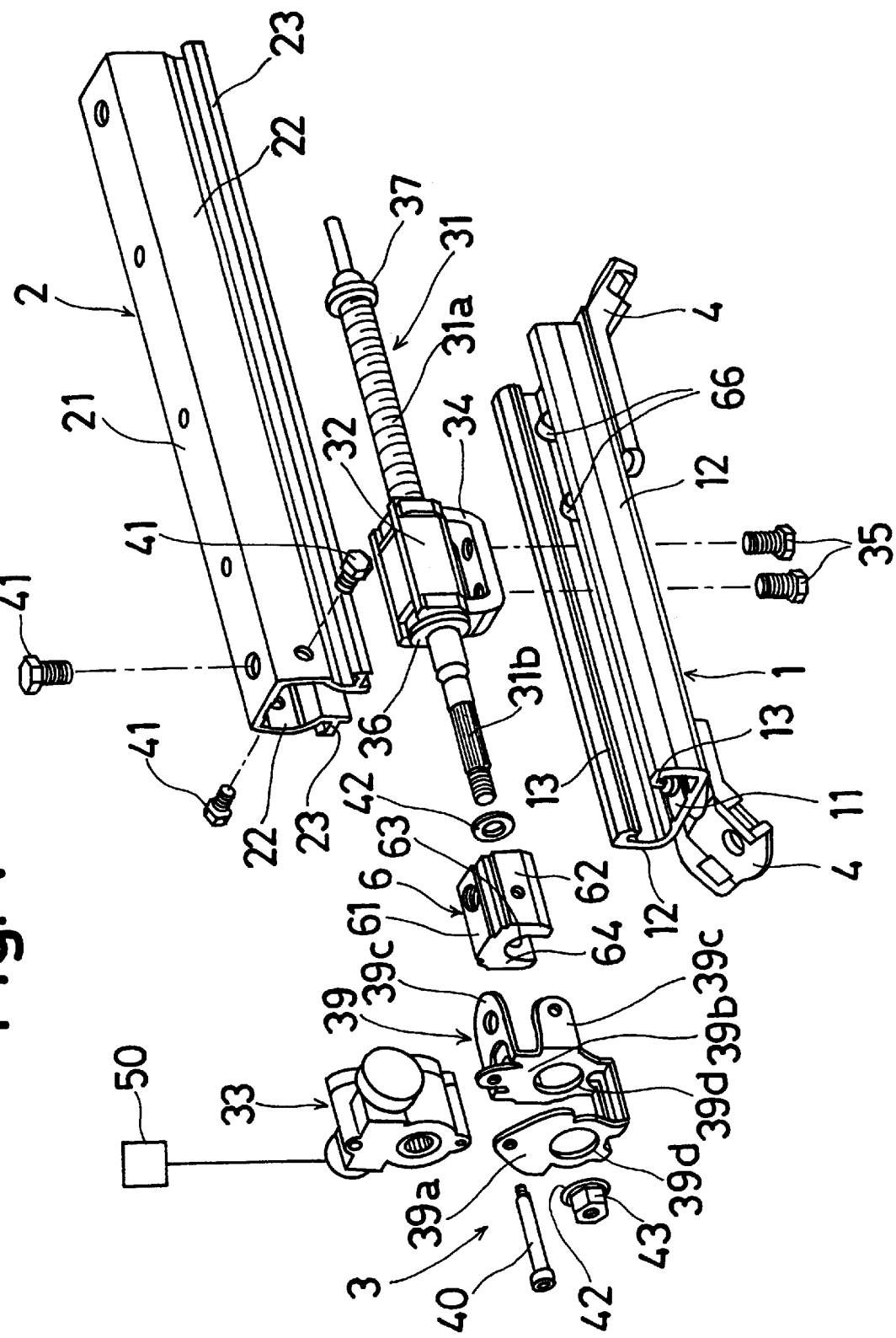
FIG. 1 is an exploded perspective of a portion of a vehicular power seat slide device in accordance with an embodiment of the present invention.
Figure 2:
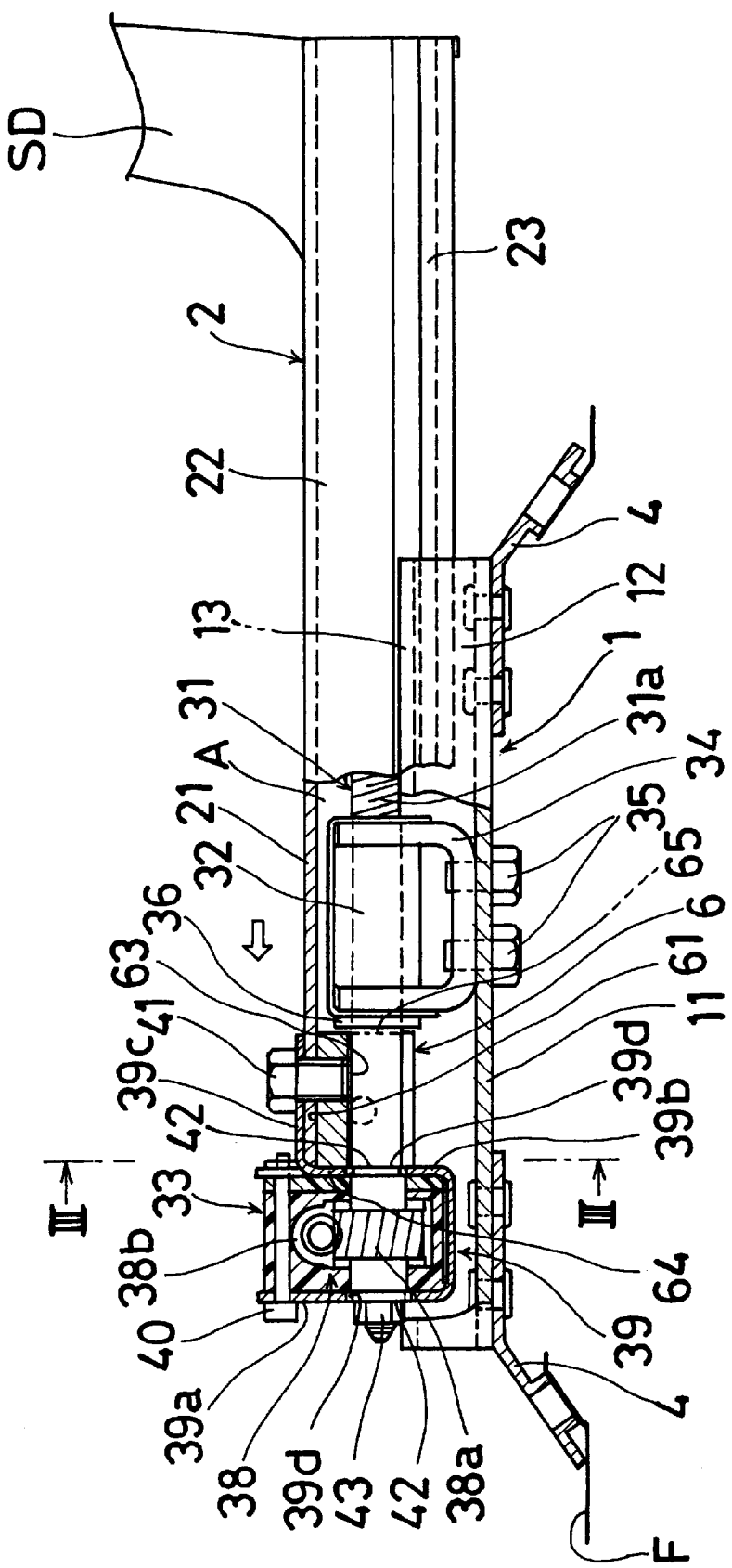
FIG. 2 is a front view of the vehicular power seat slide device shown in FIG.1.
Figure 3:
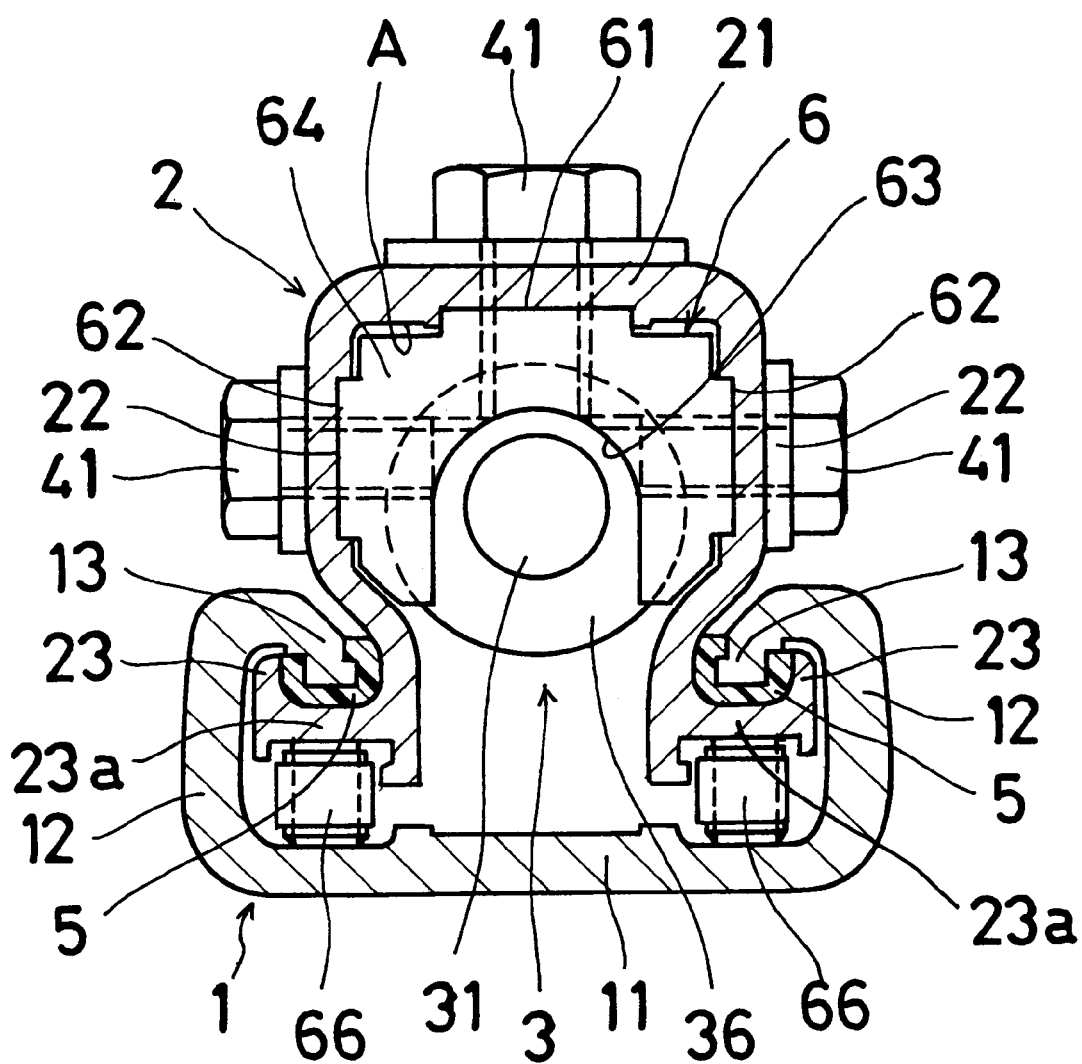
FIG. 3 is a cross-sectional view taken along the section line III—III in FIG.2.

Referring to FIGS. 1–3, the vehicular power seat slide device of the present invention includes as its major elements a pair of laterally spaced lower rails 1, only one of which is illustrated, a pair of laterally spaced upper rails 2, only one of which is illustrated, and a driving mechanism 3. It is to be understood that both lower rails 1 posses the same general configuration and so the description below applies to both lower rails. Each of the lower rails 1 is elongated and extends in the vehicular lengthwise direction. Each lower rail 1 possesses a substantially U-shaped cross-section with a bottom wall 11 and a pair of upstanding side walls 12, 12 that extend from respective opposite longitudinally extending edges of the bottom wall 11. Inwardly oriented hooks 13, 13 extend from the respective uppermost end portions of the side walls 12, 12. A bracket 4, 4 is provided at each of the longitudinal opposite end portions of the bottom wall 11 of the lower rail 1. The lower rail 1 is adapted to be secured to the vehicle body floor F by way of these brackets 4, 4.

It is to be understood that both upper rails 2 posses the same general configuration and so the description below applies to both lower rails. Each upper rail 2 is elongated and also extends in the vehicular lengthwise direction. The upper rail 2 possesses a substantially inverted U-shaped cross-section with a top wall 21 and a pair of downwardly extending side walls 22, 22 which extend from the respective longitudinally extending edges of the top wall 21. In addition, respective flanges 23, 23 extend outwardly from the respective lowermost end portions of the side walls 21, 21. An inner space A is defined within the upper rail 2. As shown in FIG. 2, the lower portion of a seat-cushion SC of a vehicular seat is fixedly mounted on the top wall 21 of the upper rails 2.

Each upper rail 2 is assembled to the respective lower rail 1 so that each flange 23 of the upper rail 2 interlocks with the corresponding flange 13 of the lower rail 1 via a rubber-made shoe member 5, which allows the upper rail 2 to slide along the corresponding lower rail 1 in the vehicle lengthwise direction. Each of the flange portions 23 of the upper rail 2 has an integral horizontal wall 23a which extends generally parallel to the bottom wall 11 of the lower rail 1. A plurality of rollers 66 are arranged between the bottom wall 11 of the lower rail 1 and the horizontal wall 23a of the flange portion 23. These rollers 66 assist the sliding movement of the upper rail 1 along the lower rail 2.

The driving mechanism 3 includes a screw shaft 31, a nut member 32, and a gear box 33. The screw shaft 31 extends in the vehicle lengthwise direction and is disposed in the inner space A of the upper rail 2. The opposite end portions of the screw shaft 31 are rotatably supported by the top wall 21 of the upper rail 2 as will be described in more detail below. The nut member 32 is secured to a U-shaped bracket 34 which is fixed to the bottom wall 11 of the lower rail 1 by way of a fixing mechanism which in the illustrated embodiment is in the form of several bolts 35, 35. The nut member 32 is threadably mounted on the threaded portion 31a of the screw shaft 31. A pair of fixed flange-shaped stoppers 36, 37 is disposed on the threaded portion 31a of the screw shaft 32. The fixed flange-shaped stoppers, or simply flanges, 36, 37 are located at the extreme ends of the threaded portion 31a.

The gear box 33 is formed of a synthetic resin and possesses a substantially rectangular cross-section. Accommodated within the gear box 33 is a speed reduction gear train 38 constituted by a meshing worm wheel gear 38a and worm gear 38b. The gear box 33 is fitted in a mount in the form of a bracket 39 positioned at the front side of the upper rail 2. The bracket 39 possesses a substantially U-shaped construction that includes a front wall 39a and a rear wall 39b which respectively engage the front side and the rear side of the gear box 33. The gear box 33 is fitted in the bracket 39 and is fixed to the bracket 39 by a screw 40 which passes through the gear box 33 and is secured to the front and rear walls 39a, 39b of the bracket 39.

The rear wall 39b of the bracket 39 is provided with a plurality of integrally formed flange portions 39c. A plurality of bolts 41 pass through the flange portions 39c of the bracket 39 and establish respective connections of the bracket 39 to the top wall 21 and the side walls 22 of the upper rail 2. The front and rear walls 39a, 39b of the bracket are each provided with a respective hole 39d, 39d which are axially aligned with each other.

The front end portion of the screw shaft 31 passes through a washer 42, the bracket 39, the gear box 33, and another washer 42, and a nut is then mounted on the front end portion of the screw shaft 31. The front end portion of the screw shaft 31 is provided with a serration portion 31b that is adapted to engage the worm wheel gear 38a in the gear box 33 for unitary rotation. The worm gear 38b of the speed reduction gear train 38 is connected, for example by way of a torque transmitting member such as a cable, to a motor forming an electric driving source 50 which is schematically shown in FIG. 1. It is to be noted that the radius or diameter of each of the holes 39d, 39d in the front and rear walls 39a, 39b of the bracket 39 is larger than the radius or diameter of the screw shaft 31. The washers 42, 42 are sized and positioned with respect to the bracket 39 so as to be in direct contact with the gear box 33.

In operation, when the motor or drive source 50 is turned on, the resultant rotation of the output shaft is transmitted to the screw shaft 31 by way of the speed reduction gear train 38 in the gear box 33. This causes rotation of the screw shaft 31, thereby moving the nut member 32 relative to the screw shaft 31. However, because the nut member 32 is fixed to the lower rail 1, axial movement of the screw shaft 31 occurs, thereby establishing movement of the upper rail 2 relative to the lower rail 1. It is thus possible by way of this construction to effect vehicle-lengthwise directional adjustment of the seat device SD relative to the vehicle body floor F.

In addition, the threaded engagement between the screw shaft 31 and the nut member 32 prevents unexpected movement of the upper rail 2 relative to the lower rail 1 when a force in the axial direction is applied to the upper rail 2. Thus, the position of the seat device SD remains unchanged. It is to be noted that when the front side of the nut member 32 is brought into engagement with the stopper 36, further advancing movement of the nut member 34 relative to the screw shaft 31 is prevented, thereby defining the farthest adjustment position of the seat device SD in one direction (e.g., a front-most position of the seat device SD). Similarly, when the rear side of the nut member 32 is brought into engagement with the stopper 37, further retracting movement of the nut member 34 relative to the screw shaft 31 is prevented, thereby defining the farthest adjustment position of the seat device SD in the opposite direction (e.g., a rear-most position of the seat device SD.)

A block member 6 is accommodated in the inner space A of the upper rail 2. The block member 6 includes a top surface 61 in contact with the top wall 21 of the upper rail 2 and two side surfaces 62, 62 in contact with the respective ones of the side walls 22, 22 of the upper rail 2. An inverted generally-U shaped groove 63 is formed in the lower portion or lower facing surface of the block member 6. This groove 63 extends in the axial direction and the screw shaft 31 passes through the groove 63. The block member 6 is positioned at the front end portion of the upper rail 2 and is located between the brackets 39, 34 as seen in FIG. 2. The block member 6 is secured to the upper rail 2. In the disclosed embodiment, the block member 6 is secured to the upper rail 2 by way of the same bolts 41 that connect the bracket 39 to the upper rail 2.

As seen in FIG. 2, the front surface 64 of the block member 6 faces the rear side or rear wall 39b of the bracket 39. Preferably, the front surface 64 of the block member 6 is in face-to-face contact with the surface of the rear wall 39b of the bracket 39, although it is possible to provide a very small clearance which would nevertheless allow face-to-face contact in the manner described below in more detail. As also seen in FIG. 2, the rear surface 65 of the block member 6 faces the stopper 36 located at the front side of the bracket 34. In the preferred embodiment, the rear surface 65 of the block member 6 is positioned relative to the stopper 36 such that a small clearance exists between the rear surface 65 of the block member 6 and the facing surface of the stopper 36. This small clearance helps avoid friction between the rear surface 65 of the block member 6 and the stopper 36 when the screw shaft 31 rotates. Notwithstanding this small clearance, the rear surface 65 of the block member 6 and the stopper are adapted to be brought into face-to-face contact with each other as described below in more detail.

In the event of a collision of the vehicle body with another vehicle or with some other rigid member, the resulting vehicle lengthwise directional load indicated by the arrow in FIG. 2 is applied from the seat device SD to the upper rail 2. The thread engagement between the screw shaft 31 and the nut member 32 bears this load, and prevents the upper rail 2 from being moved relative to the lower rail 1, thereby inputting the load to the screw shaft 31. However, at this time, the front surface 64 of the block member 6 is brought into engagement with the rear wall 39b of the bracket 39 in a face-to-face manner. The load is thus received by the block member 6 and is then transmitted to the upper rail 2. Hence, the load applied to the upper rail 2 upon collision is applied to the screw shaft 31 by way of the screws 41, the block member 6 and the gear box 31. The face-to-face contact between the surface of the rear side 39b of the bracket 39 and the block member 6 provides a generally even pressure distribution, thereby avoiding application of a pressure to the gear box 33 that would tend to move the gear box 31 relative to the screw shaft 31. Deformation of the screw shaft 31 is thus substantially eliminated. The bracket 39 is generally immovable on the screw shaft 31 and reflects the applied force as a reaction force to the upper rail 2 by way of the block member 6. Thus, the load applied to the gear box 33 is limited to a compression load, thereby restricting the downward action on the gear box 33.

In the event of a collision of the vehicle body with another vehicle or with some other rigid object causing a load in the vehicle lengthwise direction that is in a direction opposite to the arrow shown in FIG. 2, this load is applied from the seat device SD to the upper rail 2. The thread engagement between the screw shaft 31 and the nut member 32 endures this load and prevents the upper rail 2 from being moved relative to the lower rail 1, thereby inputting the load to the screw shaft 31. However, at this time, the rear surface 65 of the block member 6 is brought into engagement with the generally immovable stopper 36 in a face-to-face contacting manner. The force applied to the stopper 36 is transmitted as a reaction force to the upper rail 2 by way of the upper block 6. Thus, the load applied to the gear box 33 is significantly reduced, thereby restricting the upward action on the gear box 33.

As can be seen from the foregoing description, the block member 6 is mounted on the upper rail so as to be located between the gear box 33 and the flange 36 of the screw shaft. As a result, the block member 6 receives the load applied to the upper rail 2 via the screw shaft 31. As a result, the upward and downward urging actions on the gear box 33 are advantageously restricted, thereby reducing the possible bending moment applied to the screw shaft. The screw shaft 31 and the gear box 33 are much less susceptible to deformation and breakage, thus allowing advantageous realization of a remarkable strength increase of the seat slide device.

In addition, in the present invention, the flange 36 serves as a stopper of the nut member 32 which is threadably mounted on the screw shaft 31. Thus, the seat slide device according to the present invention can be relatively easily reinforced by adding only the block member. This results in a decrease in the number of parts as well as a decrease in the production costs.

Moreover, the block member 6 is accommodated in the inner space of the upper rail 2 so that the block member 6 engages the top wall and both side walls of the upper rail 2. This advantageously reinforces the cross-section of the upper rail, thereby improving the ability of the device to prevent separation of the upper rail from the lower rail.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A vehicular power seat slide device comprising:
a lower rail adapted to be fixed to a vehicle body floor;
an upper rail for supporting a seat device, the upper rail being slidably mounted on the lower rail;
a nut member secured to the lower rail;
a screw shaft threadably engaged with the nut member;
an electrical drive source producing a rotational output upon operation;
a flange provided on the screw shaft;
a gear box held by the upper rail and operatively associated with the electrical drive source and the screw shaft, the gear box transmitting the rotational output from the electrical drive source to the screw shaft to establish rotation of the screw shaft relative to the nut member to thereby effect sliding movement of the upper rail relative to the lower rail;
a bracket for accommodating the gear box; and
a block member secured to the upper rail and mounted relative to the screw shaft to allow rotation of the screw shaft, the block member being positioned between the flange and the gear box, one end of the block member being engageable with the bracket in a face-to-face manner and an opposite end of the block member being engageable with the flange in a face-to-face manner.

2. A vehicular power seat slide device as set forth in claim 1, wherein the flange is positioned relative to the nut member to operatively engage the nut member and restrict movement of the upper rail relative to the lower rail.

3. A vehicular power seat slide device as set forth in claim 1, wherein the upper rail possesses a top wall and opposite side walls defining a substantially inverted U-shaped cross-section providing an inner space, the block member being positioned in the inner space of the upper rail and in contact with the top wall and both side walls of the upper rail.

4. A vehicular power seat slide device as set forth in claim 1, including a bracket in which is accommodated the gear box, said bracket being secured to the upper rail by way of a securing mechanism.

5. A vehicular power seat slide device as set forth in claim 4, wherein the block member is secured to the upper rail by the securing mechanism that secures the bracket to the upper rail.

6. A vehicular power seat slide device comprising:

a lower rail adapted to be fixed to a vehicle body floor;

an upper rail for supporting a seat device, the upper rail being slidably mounted on the lower rail;

a nut member secured to the lower rail;

a screw shaft threadably engaged with the nut member;

a flange provided on the screw shaft;

a gear box secured to the upper rail and operatively associated with the screw shaft to establish rotation of the screw shaft relative to the nut member to effect sliding movement of the upper rail relative to the lower rail;

a mount in which is accommodated the gear box, said mount being secured to the upper rail; and means secured to the upper rail and operatively engageable with the flange to transmit a load force occurring during a collision and applied to the screw shaft to the upper rail.

7. A vehicular power seat slide device as set forth in claim 6, wherein said means is a block member partially surrounding the screw shaft, one end of the block member being engageable with the mount in a face-to-face contacting manner and an opposite end of the block member being engageable with the flange in a face-to-face contacting manner.

8. A vehicular power seat slide device as set forth in claim 6, wherein the upper rail possesses a top wall and opposite side walls defining a substantially inverted U-shaped cross-section providing an inner space accommodating said means, said means being in contact with the top wall and both side walls of the upper rail.

9. A vehicular power seat slide device as set forth in claim 6, including a bracket in which is accommodated the gear box, said bracket being secured to the upper rail by way of a securing mechanism.

10. A vehicular power seat slide device as set forth in claim 9, wherein said means is a block member that is secured to the upper rail by the securing mechanism that secures the bracket to the upper rail.

11. A vehicular power seat slide device comprising:

a lower rail adapted to be fixed to a vehicle body floor;

an upper rail for supporting a seat device, the upper rail being slidably mounted on the lower rail;

a nut member secured to the lower rail;

a screw shaft threadably engaged with the nut member;

a gear box mount secured to said upper rail;

a gear box accommodated within said gear box mount and operatively associated with the screw shaft to establish rotation of the screw shaft relative to the nut member to effect sliding movement of the upper rail relative to the lower rail;

a block member secured to the upper rail and positioned in substantially contacting relationship to said gear box mount to operatively engage the gear box mount and transmit a load force occurring during a collision and applied to the screw shaft to the upper rail by way of the block member; and a securing mechanism securing said gear box and said block member to the upper rail.

12. A vehicular power seat slide device as set forth in claim 11, wherein the upper rail possesses a top wall and opposite side walls defining a substantially inverted U-shaped cross-section providing an inner space accommodating said block member, said block member being in contact with the top wall and both side walls of the upper rail.

13. A vehicular power seat slide device as set forth in claim 12, including a flange fixed to the screw shaft on a side of the block member opposite said gear box, said block member being engageable with said flange in a face-to-face contacting manner to transmit a load force occurring during a collision and applied to the screw shaft to the upper rail by way of the block member.

* * * * *